US012755104B2

(12) United States Patent
Devine et al.

(10) Patent No.: US 12,755,104 B2
(45) Date of Patent: Oct. 6, 2026

(54) APPARATUS AND METHOD FOR AUTOMATICALLY GENERATING PROPOSED EMPLOYMENT ACHIEVEMENTS

(71) Applicant: TalentSky, Inc., Los Altos, CA (US)

(72) Inventors: Richard S. Devine, Los Altos, CA (US); Johanna Lobo, Los Altos, CA (US); Rizwan Ahmed, Los Altos, CA (US); David Han, Los Altos, CA (US); Justin Kempton, Los Altos, CA (US); Kameron Bertine, Los Altos, CA (US)

(73) Assignee: TalentSky, Inc., Los Altos, CA (US)

( * ) Notice: Subject to any disclaimer, the term of this patent is extended or adjusted under 35 U.S.C. 154(b) by 147 days.

(21) Appl. No.: 18/913,744

(22) Filed: Oct. 11, 2024

(65) Prior Publication Data

US 2026/0105253 A1 Apr. 16, 2026

(51) Int. Cl.
*G06F 40/30* (2020.01)

(52) U.S. Cl.
CPC .................................... *G06F 40/30* (2020.01)

(58) Field of Classification Search
CPC .......... G06F 40/30; G06F 40/00; G06F 40/20; G06F 40/279
See application file for complete search history.

(56) References Cited

U.S. PATENT DOCUMENTS

| | | | | |
|---|---|---|---|---|
| 9,720,707 B1 * | 8/2017 | Shook | G06Q 10/105 |
| 2014/0122361 A1 * | 5/2014 | Vianello | G06Q 10/10 705/321 |
| 2020/0005194 A1 * | 1/2020 | Rao | G06N 20/20 |
| 2022/0327492 A1 * | 10/2022 | Vontobel | G06F 16/367 |
| 2023/0036730 A1 * | 2/2023 | Casa | G06Q 20/363 |

FOREIGN PATENT DOCUMENTS

CN 118710235 A * 9/2024 ............. G06N 20/20

* cited by examiner

*Primary Examiner* — Linda Wong
(74) *Attorney, Agent, or Firm* — Cooley LLP

(57) ABSTRACT

A computer implemented method maintains in a database descriptive text characterizing employment roles, employment tasks, employment skills, and image descriptions. Employment role vectors, employment task vectors, employment skill vectors and image description vectors are formed. A selected role is received. A selected role vector is associated with the selected role. A list of matching employment tasks is produced. A selected employment task and an associated selected employment task vector are received. A list of matching employment skills is produced. A list of matching images is produced. A request for employment achievements is received. The selected role is used to produce a list of achievements where each achievement includes a selection from the list of matching employment skills and an image from the list of matching images. A selected achievement is received. The selected achievement is posted to a computer network data feed.

5 Claims, 12 Drawing Sheets

FIG. 11
1100
1102
1104
1106
PRODUCT
Developed New Marketing Strategy

APPARATUS AND METHOD FOR AUTOMATICALLY GENERATING PROPOSED EMPLOYMENT ACHIEVEMENTS

FIELD OF THE INVENTION

This invention relates generally to computer network communications. More particularly, this invention relates to techniques for automatically generating proposed employment achievements in a computer network.

BACKGROUND OF THE INVENTION

People find it challenging to clearly articulate the employment roles, tasks and skills they have developed. A similar challenge is associated with articulating employment achievements. It would be desirable to facilitate the articulation of employment roles, tasks and skills and use such information to automatically generate proposed employment achievements.

SUMMARY

A computer implemented method maintains in a database descriptive text characterizing employment roles, employment tasks, employment skills, and image descriptions. Employment role vectors, employment task vectors, employment skill vectors and image description vectors are formed. A selected role is received. A selected role vector is associated with the selected role. A list of matching employment tasks is produced. A selected employment task and an associated selected employment task vector are received. A list of matching employment skills is produced. A list of matching images is produced. A request for employment achievements is received. The selected role is used to produce a list of achievements where each achievement includes a selection from the list of matching employment skills and an image from the list of matching images. A selected achievement is received. The selected achievement is posted to a computer network data feed.

BRIEF DESCRIPTION OF THE DRAWINGS

The invention is more fully appreciated in connection with the following detailed description taken in conjunction with the accompanying drawings, in which.

Like reference numerals refer to corresponding parts throughout the several views of the drawings.

DETAILED DESCRIPTION

Figure 1:
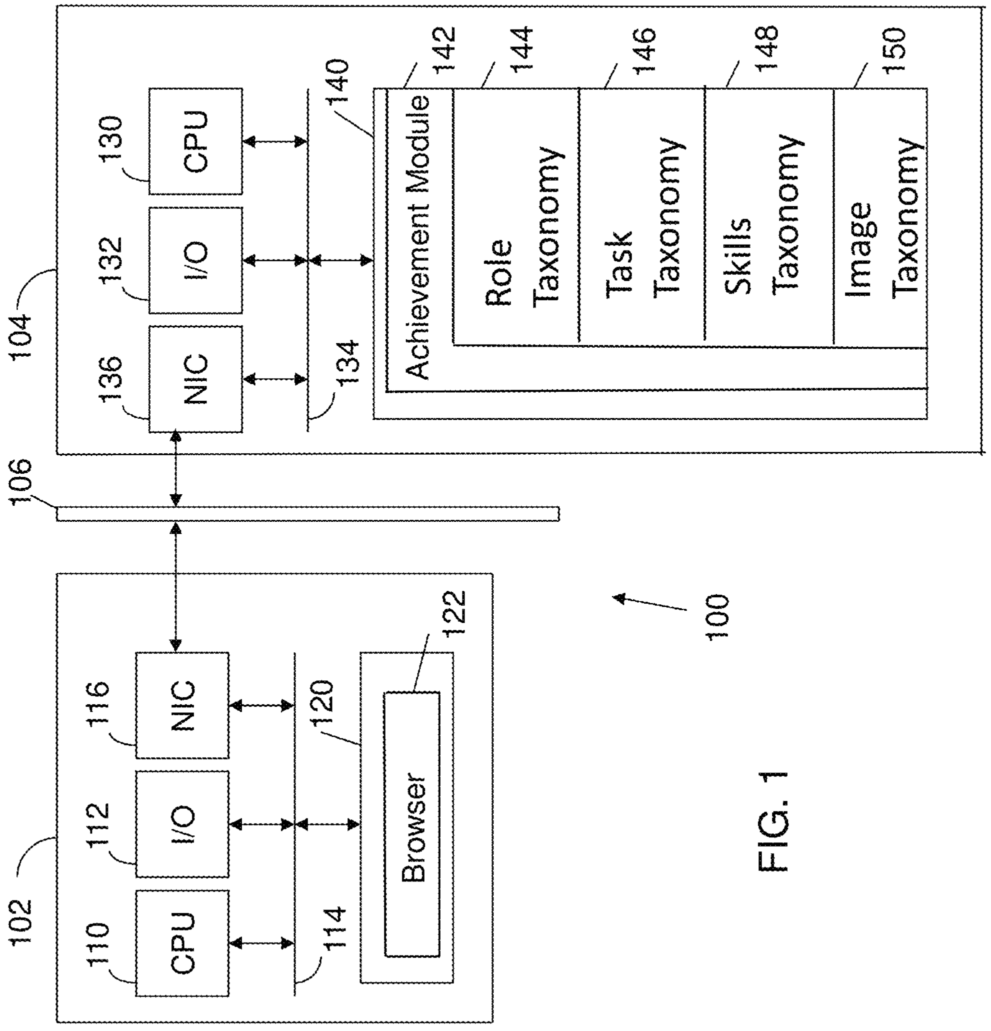
FIG. 1 illustrates a system configured in accordance with an embodiment of the invention.

FIG. 1 illustrates a system 100 configured in accordance with an embodiment of the invention. The system 100 includes a client computer 102 in communication with a server computer 104 via a network 106, which may be any combination of wired and wireless networks. Client computer 102 includes a processor connected to input/output devices 112 via a bus 114. The input/output devices 112 may include a keyboard, mouse, touch display and the like. A network interface circuit 116 is also connected to the bus 114 to provide connectivity to network 106. A memory 120 is also connected to the bus 114. The memory 120 stores instructions executed by processor 110 to interact with server 104. By way of example, the memory 120 may store executable instructions operative as a browser 122. Client computer 102 may be a standalone computer, tablet, smart device and the like.

Server 104 includes a processor 130, input/output devices 132, a bus 134 and a network interface circuit 136. A memory 140 is connected to the bus 134. The memory stores an achievement module 142 with instructions executed by processor 130 to implement operations disclosed herein. The achievement module 142 relies upon a database of descriptive text characterizing employment roles, employment tasks, employment skills and image descriptions. This results in a role taxonomy 144, a task taxonomy 146, a skills taxonomy 148 and an image taxonomy 150.

The role taxonomy 144 contains text descriptions of thousands of employment roles. An employment role should be interpreted in its ordinary meaning of an employment function performed by an employee in a particular situation.

The task taxonomy 146 contains text descriptions of thousands of employment tasks. An employment task should be interpreted in its ordinary meaning of an employment duty performed by an employee.

The skills taxonomy 148 contains text descriptions of thousands of employment skills. An employment skill should be interpreted in its ordinary meaning of an employee's ability to perform a task well.

The image taxonomy 150 contains text descriptions of thousands of images. For example, Adobe®, San Jose, California, licenses libraries of stock images and associated textual descriptions.

The textual descriptions associated with the role taxonomy 144, the task taxonomy 146, the skills taxonomy 148 and the image taxonomy 150 are converted into employment role vectors, employment task vectors, employment skill vectors and image description vectors that are respectively stored in the role taxonomy 144, the task taxonomy 146, the skills taxonomy 148 and the image taxonomy 150. That is, the text is formed into embedded strings. Embeddings are n-dimensional mathematical vector representations of text formed by a specialized embedding model. The input to the embedding model is text and the output is an n-dimensional vector. In most cases, the vector is represented as an array of floating-point numbers. The length of the array is determined by the embedding model. The vectors allow one to mathematically compute the distance between two pieces of text during semantic matching. A small distance represents semantic similarity. A cosine similarity function is commonly used during semantic matching.

The achievement module 142 uses the role taxonomy 144, the task taxonomy 146, the skills taxonomy 148 and the image taxonomy 150 to automatically generate a list of employment achievements for a user. An employment achievement should be interpreted in its ordinary meaning of anything done by an employee with admirable effort or skill.

Figure 2:
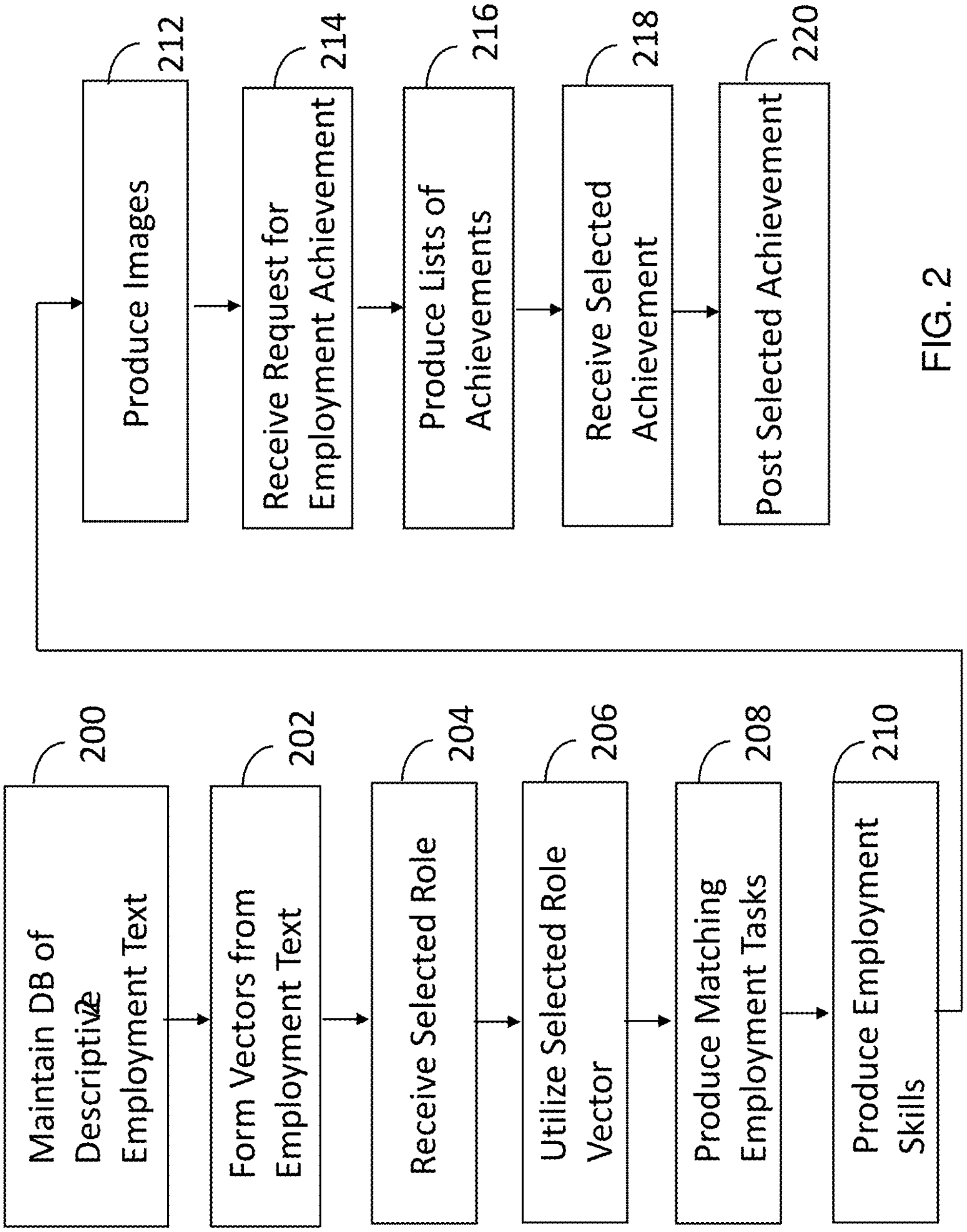
FIG. 2 illustrates processing operations associated with the disclosed achievement module.

FIG. 2 illustrates processing operations associated with the achievement module 142. A database of descriptive employment text is maintained 200. The descriptive text characterizes employment roles, employment tasks, employment skill, and image descriptions resulting in the role taxonomy 144, the task taxonomy 146, the skills taxonomy 148 and the image taxonomy 150.

Vectors are formed from the employment text 202. As previously indicated, the textual descriptions associated with the role taxonomy 144, the task taxonomy 146, the skills taxonomy 148 and the image taxonomy 150 are converted into employment role vectors, employment task vectors, employment skill vectors and image description vectors that are respectively stored in the role taxonomy 144, the task taxonomy 146, the skills taxonomy 148 and the image taxonomy 150. Computer code associated with the achievement module 140 is executed on processor 130 to produce the vectors.

Figure 3:
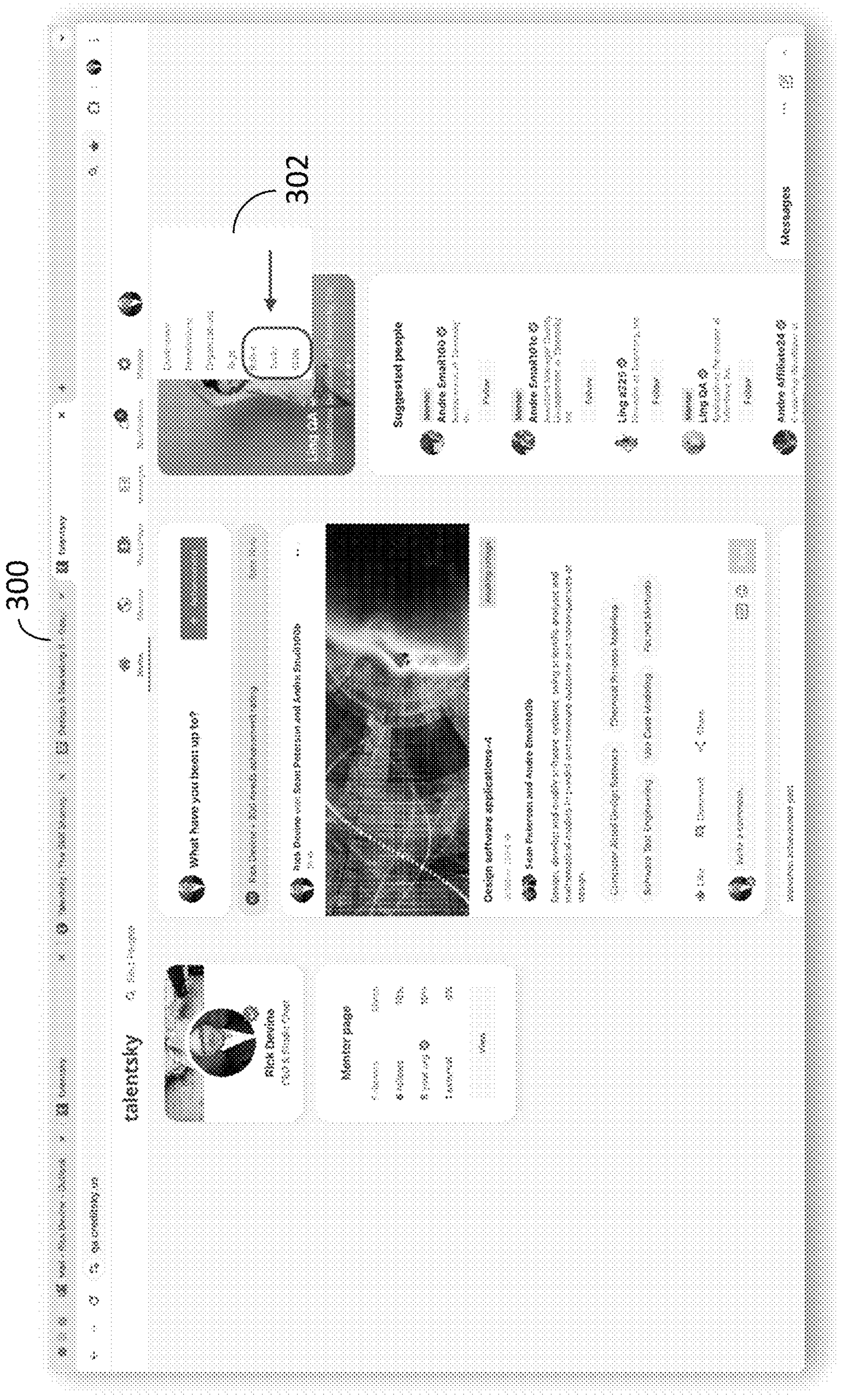
FIG. 3 illustrates an interface to allow a user to select roles, tasks and skills.
Figure 4:
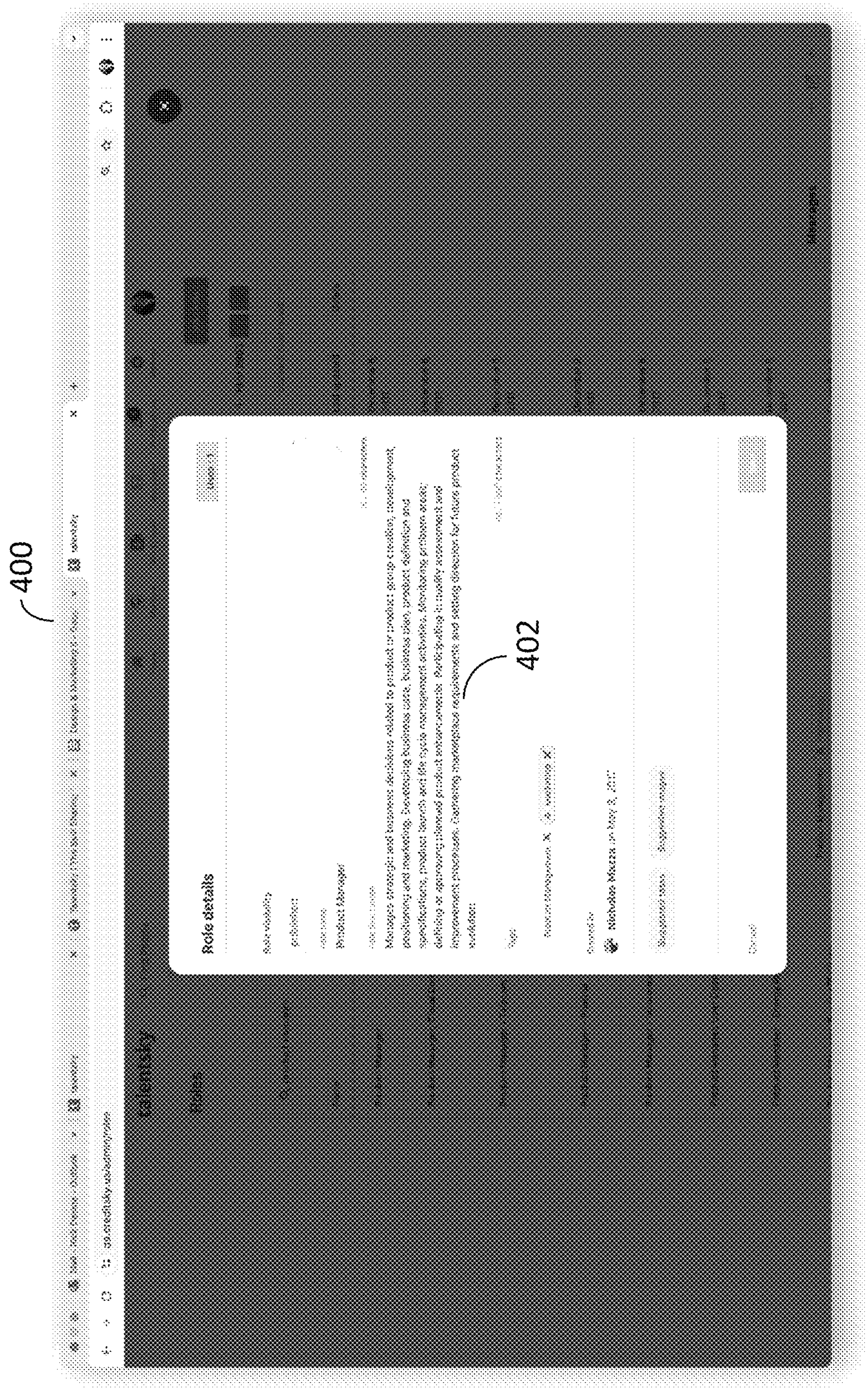
FIG. 4 illustrates an interface with role details.
Figure 5:
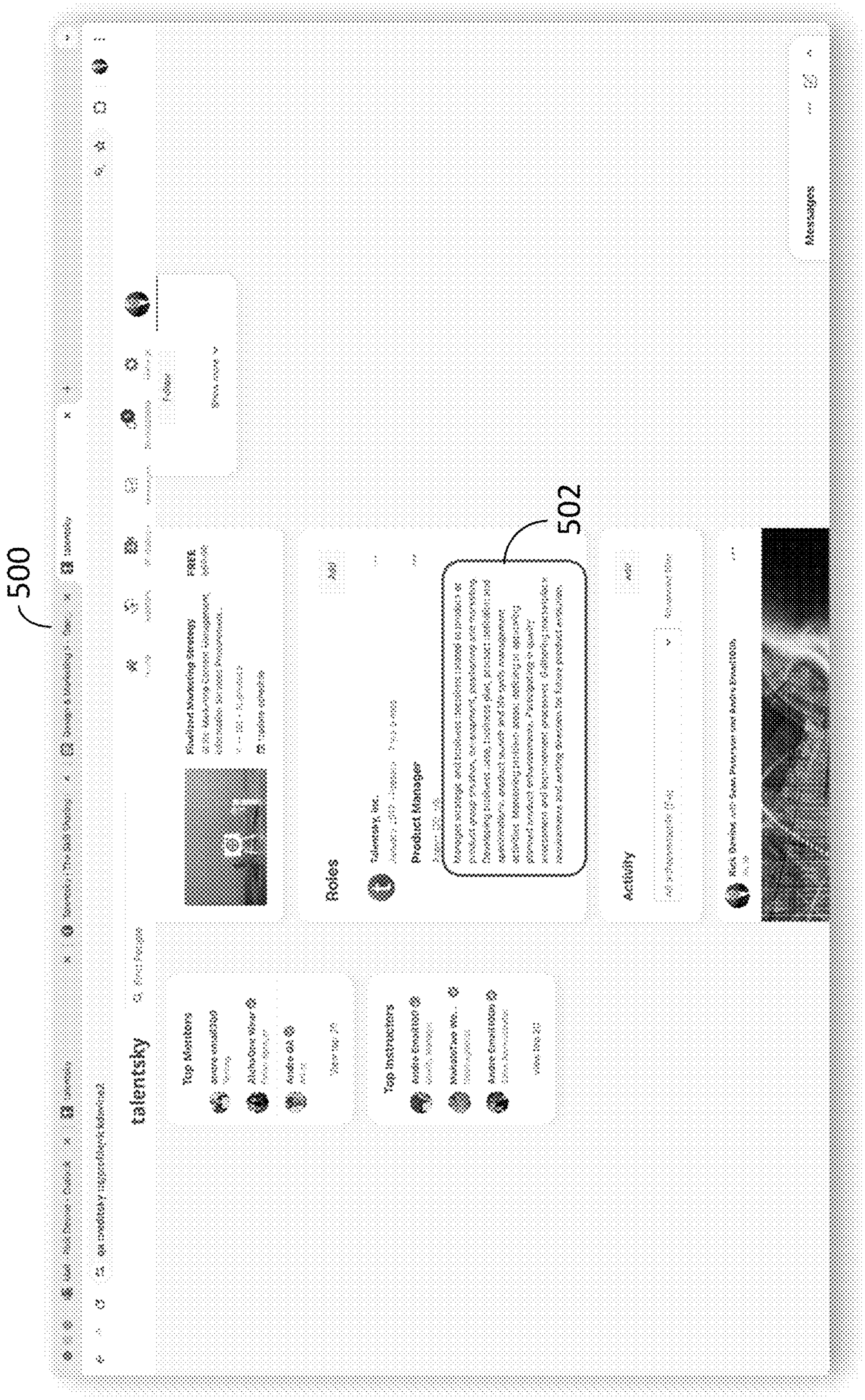
FIG. 5 illustrates an interface with a selected role appearing in a user's profile.

The next operation of FIG. 2 is to receive a selected role 204. FIG. 3 illustrates a user interface 300 which may be used to receive a selected role 204. By way of example, the achievement module 142 passes the interface to client device 102 for display on an output device, such as a screen, of the client device 102. A drop-down window 302 allows a user to select roles, tasks and skills. FIG. 4 includes an interface 400 with a textual description 402 of a product manager role. Such a description is typically prepared by a system administrator. However, embodiments of the invention include a mechanism for user submissions that are approved by the system administrator. FIG. 5 illustrates an interface 500 with text 502 that is selected by a user and is now part of a user profile page.

Returning to FIG. 2, the next operation is to utilize a selected role vector 206. For example, the text 402 is converted to an embedded string of n-dimensional mathematical vector representations using an embedding model. This may be done dynamically or the selected role vector may already be resident in the role taxonomy 144.

Figure 6:
FIG. 6 illustrates an interface displaying a list of matching employment tasks.

The next operation of FIG. 2 is to produce matching employment tasks 208. This is achieved by computing the distances between the selected role vector and the employment task vectors. FIG. 6 illustrates an interface 600 with a list 602 of tasks. The interface includes a measure 604 of the percentage match between a role and a task. This allows a user to easily add tasks to a user profile.

Figure 7:
FIG. 7 illustrates an interface displaying a list of matching employment skills.

The next operation of FIG. 2 is to produce employment skills 210. In one embodiment, a selected employment task and an associated selected employment task vector are used to compute distances between the selected employment task vector and employment skill vectors to produce a list of matching employment skills. FIG. 7 illustrates an interface 700 with a list 702 of matching employment skills. The interface includes a measure 704 of the percentage match of a skill to a task. This allows a user to easily add skills to a user profile.

Figure 8:
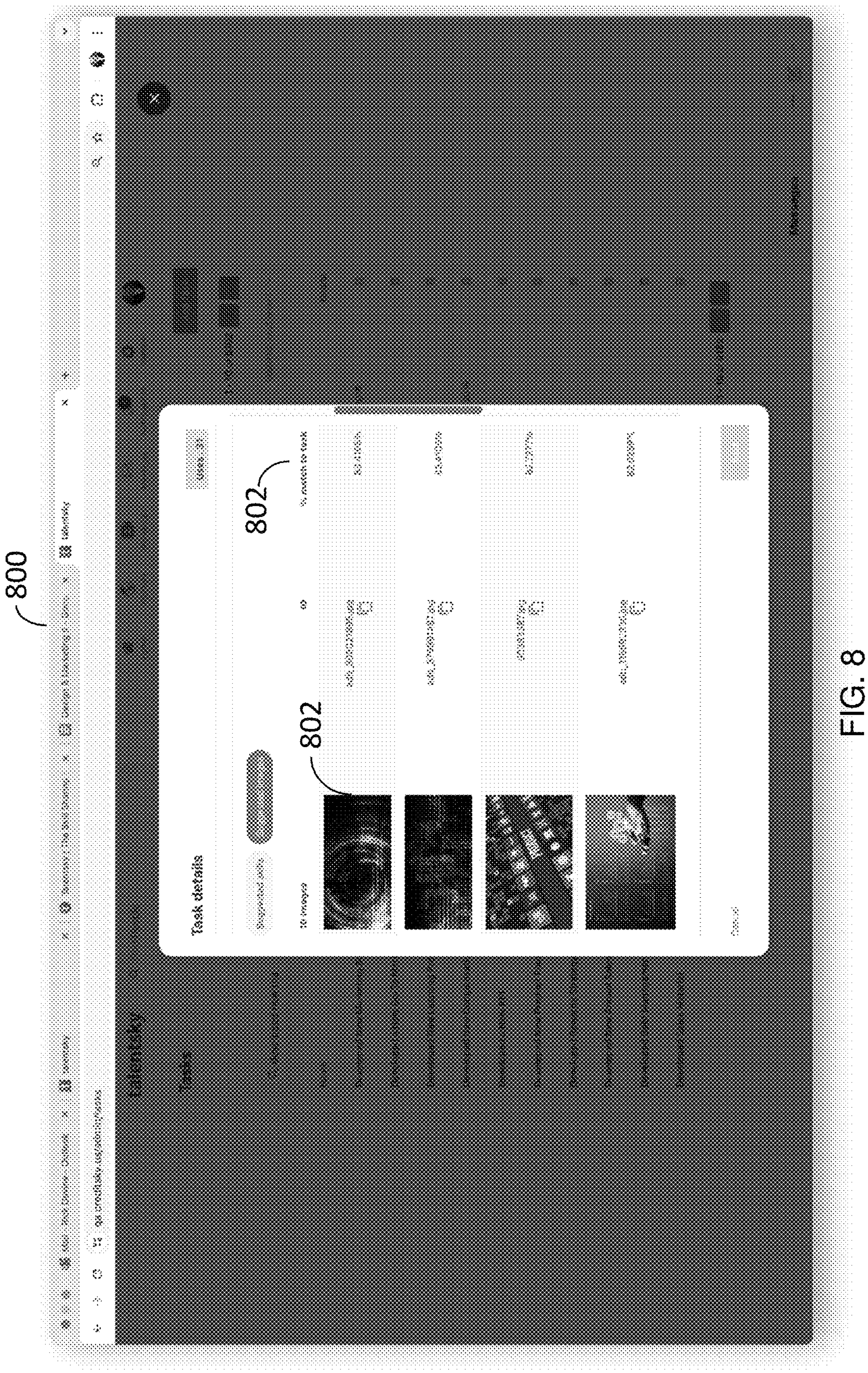
FIG. 8 illustrates an interface displaying a list of matching images.

The next operation of FIG. 2 is to produce images 212. The achievement module 142 computes the distance between a selected employment task vector and the image description vectors to produce a list of matching images. FIG. 8 illustrates an interface 800 with various images 802. The interface 800 includes a measure 802 of the percentage match between an image and a task. This allows a user to easily add images to a user profile.

Figure 9:
FIG. 9 illustrates an interface with a prompt to automatically obtain an achievement.

The next operation of FIG. 2 is to receive a request for an employment achievement 214. FIG. 9 illustrates an interface 900 with a prompt 902. Activation of the prompt 902 results in the automatic generation of proposed employment achievements 216. In one embodiment, the achievement module 142 uses a selected role, which is either user specified or system selected, to compute the distance between the selected role vector and vectors of employment achievements maintained within the achievement module. Alternately or in addition, achievements may be top skills associated with a selected role. In one embodiment, top skills are used to suggest individuals that can be used to rate a user with respect to the top skills. Those individuals are identified by the achievement module 142 as having high scores for the specified skill and some nexus to the user, such as a common employer or industry group affiliation.

Each achievement also includes an image from the list of matching images. The images have high semantic matching with the specified achievement and/or list of skills.

Figure 10:
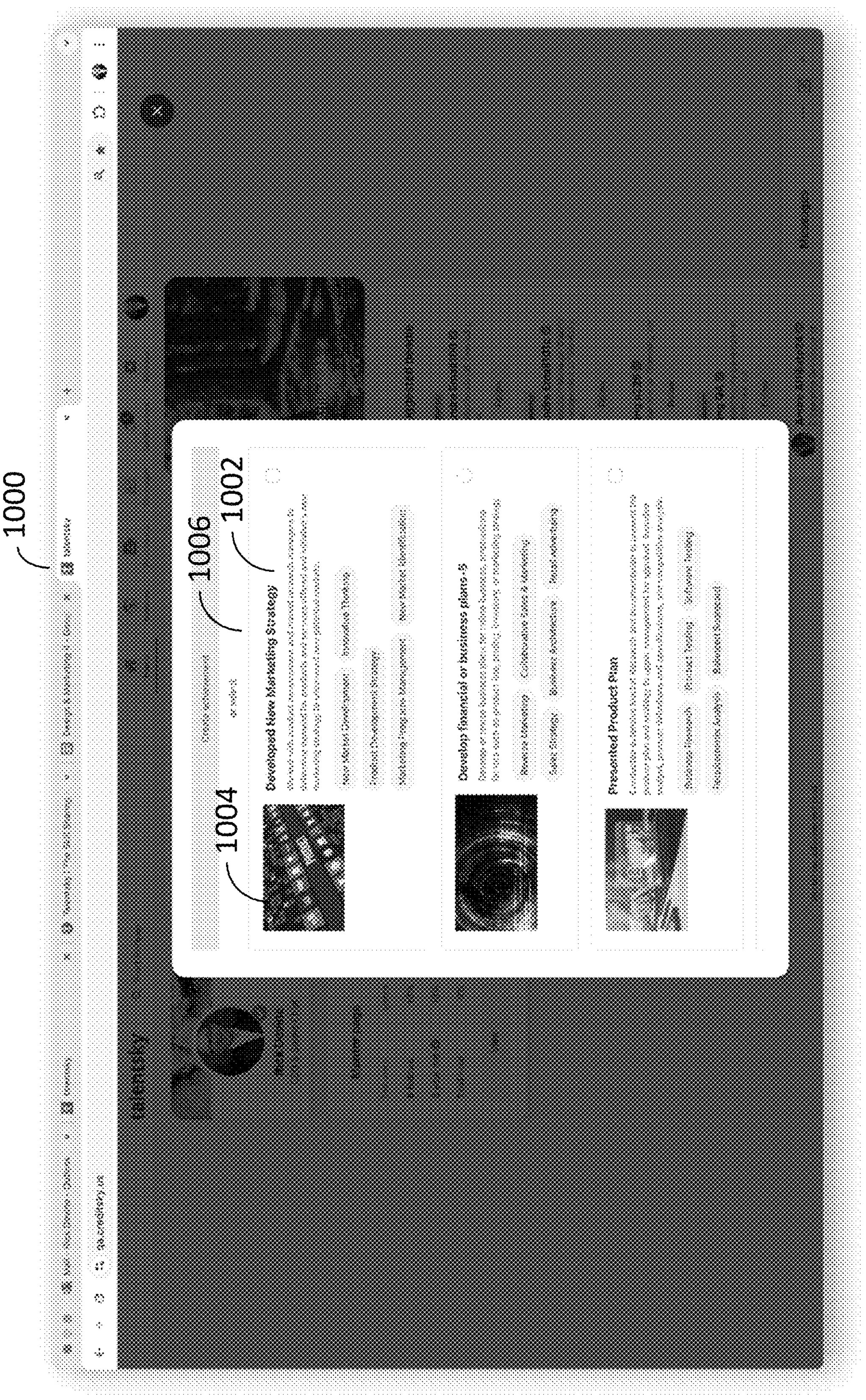
FIG. 10 illustrates an interface with proposed achievements and corresponding images.

FIG. 10 illustrates an interface 1000 with textual description 1002 of an achievement and a corresponding image 1004. A prompt 1006 allows a user to select an achievement. This results in a received selected achievement 218, the next operation of FIG. 2. Thus, a user can easily add an achievement to a user profile.

Figure 11:
FIG. 11 illustrates an interface with a selected employment achievement.
Figure 12:
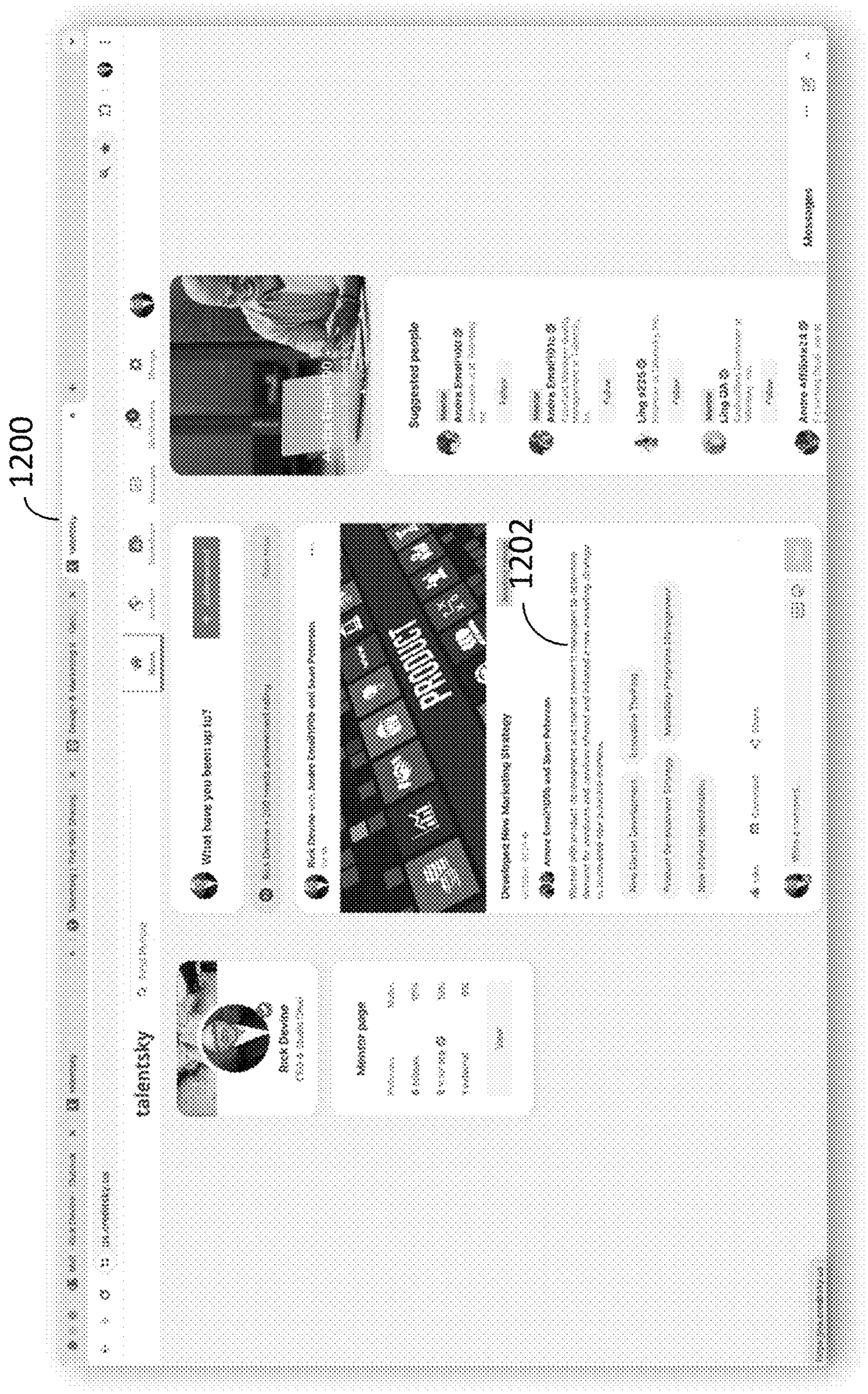
FIG. 12 illustrates a selected employment achievement in a computer network data feed.

FIG. 11 illustrates a user interface 1100 with an image 1102 and a textual description 1104 of an achievement. Prompt 1106 allows a user to post the achievement to a computer network data feed, which is the last operation 220 of FIG. 2. FIG. 12 illustrates an interface 1200 with the achievement of FIG. 11 in a computer network data feed 1202. The data feed is produced by server 104 and is available at client machine 102.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include but are not limited to: magnetic media, optical media, magneto-optical media, and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using an object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer implemented method, comprising:

maintaining in a network connected server a database of descriptive text characterizing employment roles, employment tasks, employment skills, and image descriptions;

converting with an embedding model the descriptive text into n-dimensional mathematical vector representations of the descriptive text to form employment role vectors, employment task vectors, employment skill vectors and image description vectors;

receiving a selected role from a network connected client machine;

utilizing a selected role vector associated with the selected role;

computing distances between the selected role vector and the employment task vectors to produce a list of matching employment tasks;

receiving a selected employment task and an associated selected employment task vector;

computing distances between the selected employment task vector and the employment skill vectors to produce a list of matching employment skills;

computing distances between the selected employment task vector and the image description vectors to produce a list of matching images;

receiving from the network connected client machine a request for employment achievements;

using the selected role to produce a list of achievements where each achievement includes a selection from the list of matching employment skills and an image from the list of matching images;

receiving from the network connected client machine a selected achievement from the list of achievements; and posting the selected achievement to a computer network data feed.

2. The computer implemented method of claim 1 further comprising supplying a list of individuals to rate a user with respect to employment skills.

3. The computer implemented method of claim 1 further comprising supplying percentile match scores between a role and tasks.

4. The computer implemented method of claim 1 further comprising supplying percentile match scores between tasks and skills.

5. The computer implemented method of claim 1 further comprising supplying percentile match scores between tasks and images.

* * * * *